(12) United States Patent
Meyer

(10) Patent No.: US 6,980,149 B1
(45) Date of Patent: Dec. 27, 2005

(54) MOOD RESPONSE SYSTEM

(76) Inventor: Dennis Meyer, 15114 Westchester Cir., Omaha, NE (US) 68154

( * ) Notice: Subject to any disclaimer, the term of this patent is extended or adjusted under 35 U.S.C. 154(b) by 413 days.

(21) Appl. No.: 10/285,174

(22) Filed: Oct. 31, 2002

(51) Int. Cl.$^7$ ............................................. H04L 17/18
(52) U.S. Cl. .................. 341/176; 340/825.25; 345/474
(58) Field of Search ........................ 340/825.19, 309.7; 379/88.01, 88.1, 52, 88.16, 51; 704/275, 704/270, 257

(56) References Cited

U.S. PATENT DOCUMENTS

| | | | |
|---|---|---|---|
| 4,228,470 A | 10/1980 | Rahamin et al. ............... 360/12 |
| 4,302,752 A | 11/1981 | Weitzler .................. 340/309.1 |
| 4,481,382 A | 11/1984 | Villa-Real ................ 179/2 EA |
| 4,934,079 A | 6/1990 | Hoshi ........................... 40/427 |
| 5,247,580 A | 9/1993 | Kimura et al. ................ 381/43 |
| 5,444,673 A | 8/1995 | Mathurin ..................... 368/63 |
| 5,602,963 A | 2/1997 | Bissonnette et al. ....... 395/2.84 |
| 5,878,395 A | 3/1999 | Bennett ...................... 704/275 |
| 5,890,121 A | 3/1999 | Borcherding ............... 704/272 |
| 5,900,867 A | 5/1999 | Schindler et al. ........... 345/327 |
| D417,219 S | 11/1999 | Barrette et al. ............ D14/218 |
| D420,664 S | 2/2000 | Bedol ......................... D14/168 |
| 6,031,549 A * | 2/2000 | Hayes-Roth ................. 345/474 |
| 6,047,196 A | 4/2000 | Makela et al. .............. 455/556 |
| 6,072,401 A * | 6/2000 | Kumar .................. 340/825.25 |
| 6,397,388 B1 | 5/2002 | Allen .......................... 725/133 |
| 2001/0005197 A1 | 6/2001 | Mishra et al. .............. 345/100 |
| 2002/0047943 A1 | 4/2002 | Hirai ........................... 348/734 |

FOREIGN PATENT DOCUMENTS

DE 42 07 447 3/1992 ............. G10L 5/04

* cited by examiner

Primary Examiner—Michael Horabik
Assistant Examiner—Hung Dang
(74) Attorney, Agent, or Firm—Suiter West Swantz pc llo

(57) ABSTRACT

A mood response system enables a user to communicate audio messages to another, which correspond with the emotional state of the user, over a speaker. The mood response system comprises a handheld controller disposed with a keypad, a message set switch, and three message sets, each comprising up to ten individual audio messages, which may be played over the speaker. The mood response system further includes the capability to record audio messages from the user, store them in one of the message sets, and play the recorded audio messages over the speaker.

17 Claims, 5 Drawing Sheets

MOOD RESPONSE SYSTEM

FIELD OF THE INVENTION

The present invention generally relates to the field of communication devices and particularly to a mood response system that allows an operator to select and playback an audio message that reflects the current mood of the operator.

BACKGROUND OF THE INVENTION

A typical person is bombarded with entertainment options. On a daily basis one might engage in several different professional or recreational entertainment activities. Unfortunately, many of these entertainment options isolate an individual, allowing him or her to enjoy the activity but in so doing cutting the lines of communication with others. Feelings are experienced in isolation, denying an opportunity for expression and interaction with others.

Watching a group of children playing most computer games, people see that while physically they appear to be engaged with one another, their entire attention is focused on the screen in front of them. The children seemingly become unaware of anything but the screen. Communication is between the children and the screen not one another. Adults fare little better with entertainment options such as movies, plays, concerts and the like. Here again the individual's full attention is demanded by the activity leaving little to no room for interaction amongst the individuals.

Therefore, it would be desirable to provide an entertainment option directed towards producing interactions between individuals and allowing for the expression of emotions and moods.

SUMMARY OF THE INVENTION

Accordingly, the present invention is directed to a mood response system that allows an operator to share those feelings they are currently experiencing with others around them.

In a first aspect of the present invention, the mood response system is a handheld controller that stores message sets and makes them accessible to a user. Each message set represents a different emotional state the operator may currently be experiencing and includes audio messages that may be audibly played back in order to share that emotion with another. In the present embodiment, the mood response system includes personal message recording capabilities allowing an operator to record, in their own voice, personal messages and play them back for others. Entertainment is provided to the operator and the listener through the ability to select a relevant message among several options and audibly play the message. In this manner the mood response system requires individuals to interact in order to experience its entertainment value. A comment from the mood response system made to another individual serves the purpose of entertaining and expressing emotions and a large part of the entertainment value may be contained in the response elicited from the recipient of the comment.

In a second aspect of the present invention, the mood response system provides an operator with the ability to switch between gender specific message sets and a mood indicating device. A male sense of humor may be very different from that of a female, therefore, providing different message sets for each may be beneficial in enhancing the entertainment value of the mood response system. Through use of the switch on the handheld controller an individual may find the perfect message to convey feelings they are having which may be completely different from the previous user of the handheld controller. Further, the mood indicating device may be used to establish the mood of the user or to confirm an emotional state that the user believes themselves to be in. From this information a user will then be able to determine which the message set to be searched in order to find a desired message or expression. Consequently, the entertainment value is enhanced by adding the fun of utilizing the mood indicating device.

In a third aspect of the present invention, the mood response system provides a method for communicating emotions and moods between two or more people. Using the handheld controller a user may identify the current mood or emotion he or she is experiencing, select an appropriate message from a message set stored on the mood response system, and play the message. Such a communication method provides entertainment and interaction to all those participating and targeted for a response.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
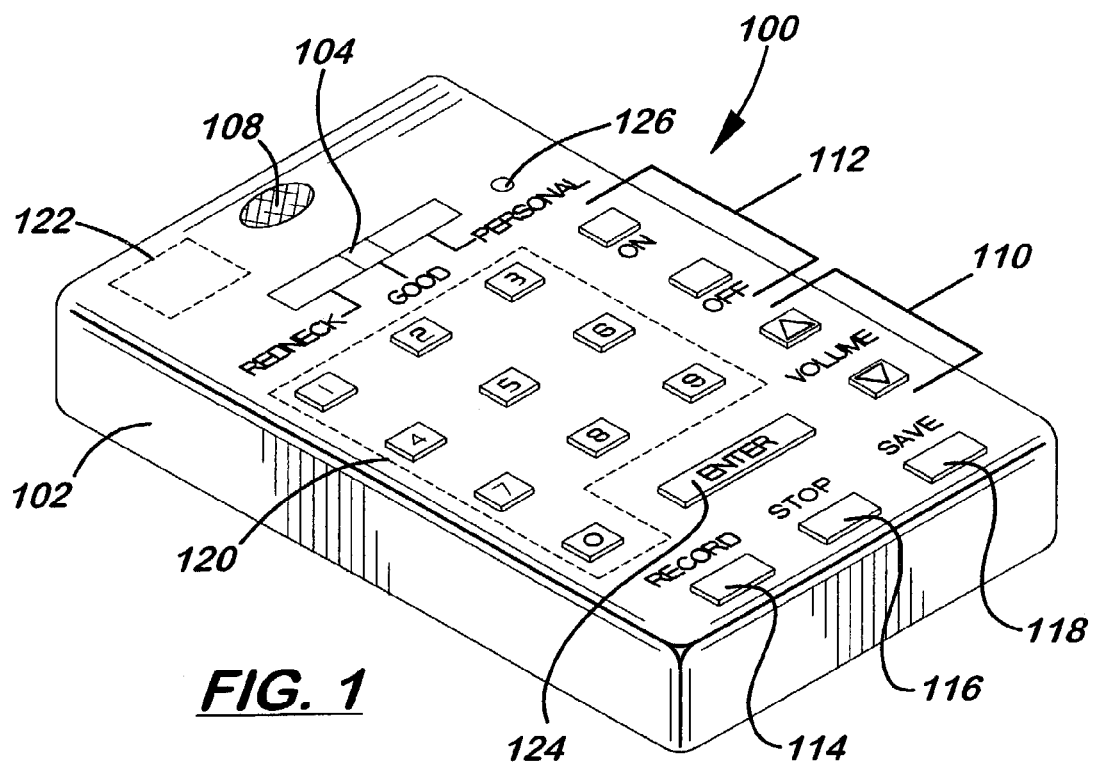
FIG. 1 is an isometric view of a mood response system in accordance with an exemplary embodiment of the present invention.
Figure 2:
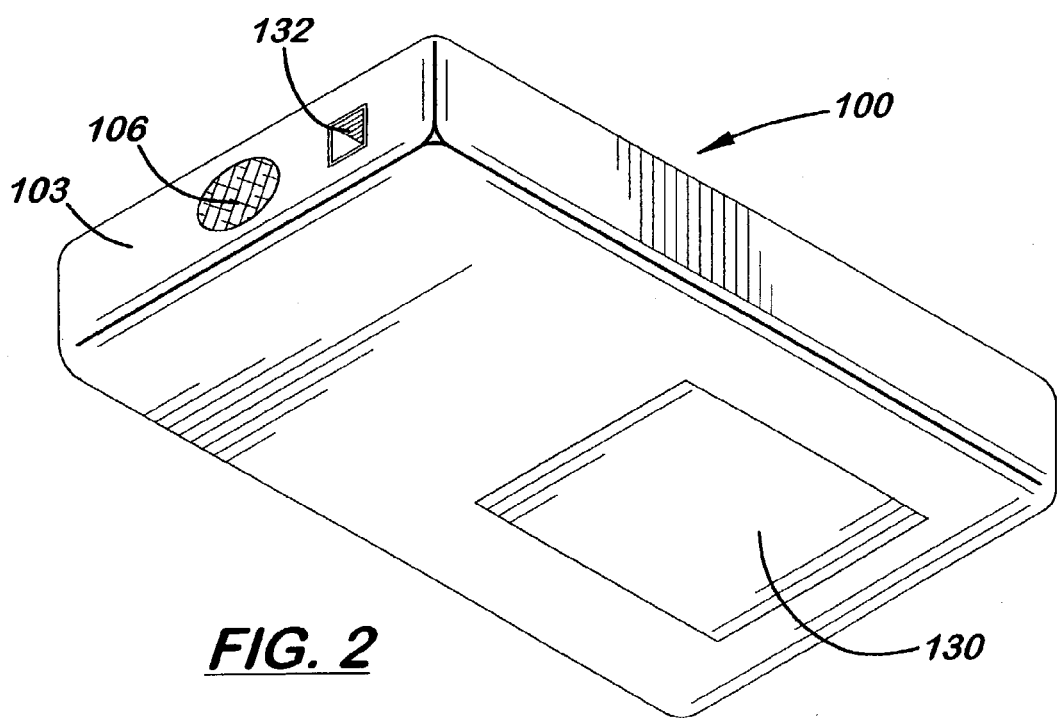
FIG. 2 is a back plan view of the mood response system in accordance with an exemplary embodiment of the present invention.

FIGS. 1 and 2 illustrate the mood response system, generally referred to by reference numeral 100. The mood response system 100 includes a handheld controller 102, a message set switch 104, a speaker 106, a microphone 108, a volume adjust mechanism 110 and an on/off switch 112. The mood response system 100 may further includes a "RECORD" button 114, a "STOP" button 116 and a "SAVE" button 118. A keypad 120 is also included on the handheld controller 102 of the mood response system 100.

In exemplary embodiments the mood response system 100 stores one or more message sets. Each of the message sets may include one or more audio messages. The message sets may be pre-programmed by the manufacturer to include specific audio messages or a message set may be established by a user of the mood response system 100 including one or more audio messages recorded by the user in his or her own voice.

For example, the mood response system 100 may include three "HIS" message sets. A first message set, a second message set, and a third message set each comprised of up to ten audio messages. It is understood that the number of message sets may be varied without departing from the scope and spirit of the invention. The first message set may include the following ten audio messages:

0. I'm home where's dinner?
1. The boys and I are going out tonight!
2. I'm supposed to eat this slop?
3. Don't touch that dial—the game's on!
4. Honey, bring me another beer!
5. We need more snacks out here!
6. Shush!—I'll miss this
7. Honey, run to the store and pick up some more chips and beer!
8. Don't wait up—it's poker night!
9. When are you going to clean up this pit?

The second message set may include the following ten audio messages:

0. Dinner sure smells good honey!
1. That was a wonderful meal sweetheart!
2. The house sure looks great!
3. Here's some money, why don't you go shopping.
4. How was your day?
5. Let me take you out to dinner!
6. What can I help you with honey?
7. You just relax, let me do the housework today.
8. You look really nice!
9. I sure love you sweetheart!

The third message set may provide the user with the ability to store up to ten audio messages recorded in his own voice. The content and number of audio messages comprising each message set may be varied as contemplated by one of ordinary skill in the art. Therefore, it is understood that the above message sets and the audio messages they include are exemplary and should not be read as exclusive.

The user of the mood response system 100 may access one of the three message sets by using the message set switch 104. In the present exemplary embodiment the message set switch 104 is a three position switch disposed above the keypad 120. Once the user moves the message set switch 104 into a particular position, the switch stays in place. It is contemplated that the message set switch 104 may include a fewer or greater number of positions. Alternately, the message set switch may be a variety of different switch mechanisms, such as a depression switch, toggle switch, or the like, without departing from the scope and spirit of the present invention. Another embodiment of the present invention may replace the message set switch with individual buttons for the selection of a particular message set.

Depending on the current mood of the user, the user selects among the three message sets. If the user is feeling upset, the user may position the message set switch 104 in a far left position denoted on the handheld controller by the word "Redneck". By placing the message set switch 104 in this position the user gains communicative access to the first message set, described previously. In the present embodiment the 0 through 9 buttons on the keypad 120 correspond to the individual audio messages, denoted 0 through 9. Alternately, the keypad 120 may comprise fewer or greater numbers of buttons in a variety of configurations. The user may select a particular audio message by depressing one of the buttons of the keypad 120. If the user is feeling happy, the user may position the message set switch 104 in the center position denoted on the handheld controller by the word "Good". By placing the message set switch 104 in this position the user gains communicative access to the second message set, described previously. As before, the 0 through 9 buttons on the keypad 120 correspond to the individual audio messages, denoted 0 through 9. If the user feels that neither of the first two message sets are appropriate for expressing the current feelings of the user then the user may position the message set switch 104 in the far right position denoted on the handheld controller by the word "Personal". By placing the message set switch 104 in this position the user gains communicative access to the third message set. The third message set, as described previously, is a set of up to ten audio messages recorded by the user. Therefore, there may be no audio messages in the third message set at any given time or there may be any number, up to ten, of audio messages that a user has communicative access to.

In the embodiment shown, the speaker 106 is positioned on a top side 103 of the handheld controller 102. The speaker 106 is of a size suitable for placement in a designated area of the handheld controller 102. Alternately, the size of the speaker 106 may vary according to the output power desired by a user. The location of the speaker 106 may vary in accordance with design specifications. The audio messages, accessed using the keypad 120, are audible from the speaker 106. The volume adjust mechanism 110, in the present embodiment, is a two button system located alongside the keypad 120, which allows the user to increase or decrease the volume of the audio message being played over the speaker 106. Other volume adjustment mechanisms and locations, as contemplated by one of ordinary skill in the art, may be employed.

In the present embodiment, the microphone 108 is located above the message set switch 104 on the handheld controller 102. The microphone is utilized by the user to record audio messages into the mood response system. As described above, the mood response system includes a message set, designated the third message set, that includes personal audio messages recorded by the user. Operation of the microphone is tied to the "RECORD", "STOP", and "SAVE" buttons, 114, 116, and 118, respectively. To record an audio message into the personal message set the user first positions the message set switch to the far right position, denoted by the word "Personal" on the handheld controller 102. Next, the user presses and releases the "RECORD" button 114 and begins speaking the message into the microphone 108. When the user has finished speaking the "STOP" button 116 is depressed. The "STOP" button identifies to the mood response system 100 that the message is completed.

The user then commands the mood response system 100 to save the audio message recorded by pressing the "SAVE" button. The last step for the user is telling the mood response system 100 what location the user wants to have the audio message saved. The user has a selection of ten different locations, which may be accessed using the keypad 120 that includes buttons 0 through 9. The user determines which number location to save the audio message in, presses the corresponding button, and then presses the "ENTER" button 124. Upon completion the user has entered a personal audio message into the mood response system 100, which may be accessed through the "Personal" message set and the corresponding button on the ten-button keypad 120.

Other methods for recording audio messages and designating audio messages into a particular message set may be employed without departing from the scope and spirit of the present invention. It is contemplated that the microphone may be in communication with other buttons which may enable the user to transmit a spoken message from the microphone 108 directly over the speaker 106.

The on/off switch 112 is a two button system in the present embodiment. Alternate on/off systems may be employed, such as a single button, a switch, and the like. Preferably, the on/off switch 112 is connected to a light 126 disposed on the handheld controller 102. However, the mood response system 100 may not include a light or may employ various systems for indicating to a user that the power is on or off. When lit, the light 126 indicates that power is on and the mood response system 100 is available.

The handheld controller 102 further includes a flag 122, which indicates to an operator the gender of the handheld controller 102. The flag 122 may have the word "HIS" or "HERS" printed on it to indicate the gender. From the flag 122, the operator is able to discern whether the handheld controller 102 includes message sets with audio messages that are applicable to a particular gender. The audio messages within the message sets, as described previously in the "HIS" message sets, may include a variety of message content which may differ for men and women. For example, a "HERS" mood response system may include a first message set, a second message set, and a third message set each comprised of up to ten audio messages, but with different audio messages. The first message set may include the following ten audio messages:

0. Get your own dinner—I'm busy.
1. Don't even think of turning on the TV!
2. Get your fat butt out of the chair and do some yard-work!
3. Get your own beer.
4. I think I'll ask mother to visit for a couple of weeks.
5. If you want a clean shirt—wash it yourself!
6. Don't even think about it.
7. I think the car is broken.
8. I'm on Strike!
9. Clean up your own pit!

The second message set may include the following ten audio messages:

0. You are my knight in shining armor.
1. I sure need you.
2. You look so manly.
3. I sure missed you today.
4. You just sit back and let me serve you dinner.
5. How do you like the new negligee I got?
6. You just watch the game—I got you snacks and plenty of beer.
7. I made your favorite pie.
8. You are my hero.
9. I sure love you sweetheart.

As described previously for the "HIS" message sets, the third message set may provide the user with the ability to store up to ten audio messages recorded in her own voice. The content and number of audio messages comprising each message set may be varied as contemplated by one of ordinary skill in the art. Therefore, it is understood that the above message sets and the audio messages they include are exemplary and should not be read as exclusive.

In the present embodiment, the shape of the handheld controller 102 is, generally, rectangular. However, it is contemplated that the handheld controller 102 may include ergonomically shaped contours and gripping pads or surfaces, to provide a more comfortable and secure shape to a user. The handheld controller 102 may be programmed to operate a variety of household appliances, such as a television, radio, CD player, and the like, without departing from the scope and spirit of the present invention. For example, the handheld controller 102 may be operable as a universal controller for a variety of electronic devices. If used as a universal remote controller the handheld controller 102 may be provided with additional functional controls, such as control buttons for a VCR which may include a "Play" button, a "Rewind" button, a "Channel Up/Down" button, or the like. The handheld controller 102 may also enable coupling with a stationary base system. The stationary base system may include the capability of increased broadcasting power of an audio message included within the mood response system. The stationary base may also enable the handheld controller 102 as a multi-appliance controller, as described previously.

In FIG. 2, the handheld controller 102 includes a panel 130 which covers a battery recess for connecting a battery to the mood response system 100. In one embodiment, the battery recess includes connection devices for coupling a nine volt battery to the mood response system 100. It is contemplated that the battery recess may be configured to connect other battery types, such as double A (AA), triple A (AAA), and the like. Other methods of powering the mood response system 100, such as using a power cord, rechargeable batteries, and the like, may be employed without departing from the scope and spirit of the present invention.

The mood response system 100, shown in FIG. 2, includes a universal serial bus port 132 on the top side 103. However, it is understood that the mood response system 100 may not include a universal serial bus port. This enables the user to connect the mood response system 100 with other electronic devices, such as a personal computer. By establishing such a connection, software that includes a variety of pre-programmed message sets may be downloaded to the personal computer and then downloaded from the personal computer to the mood response system 100. It is also contemplated that the mood response system 100 may be an information handling system capable of interfacing directly with the Internet. In such an instance, pre-programmed messages may be stored at a particular web-site and then downloaded directly to the mood response system 100. Other configurations and locations of the universal serial bus port 132 may be employed, as may be contemplated by one of ordinary skill in the art.

Figure 3:
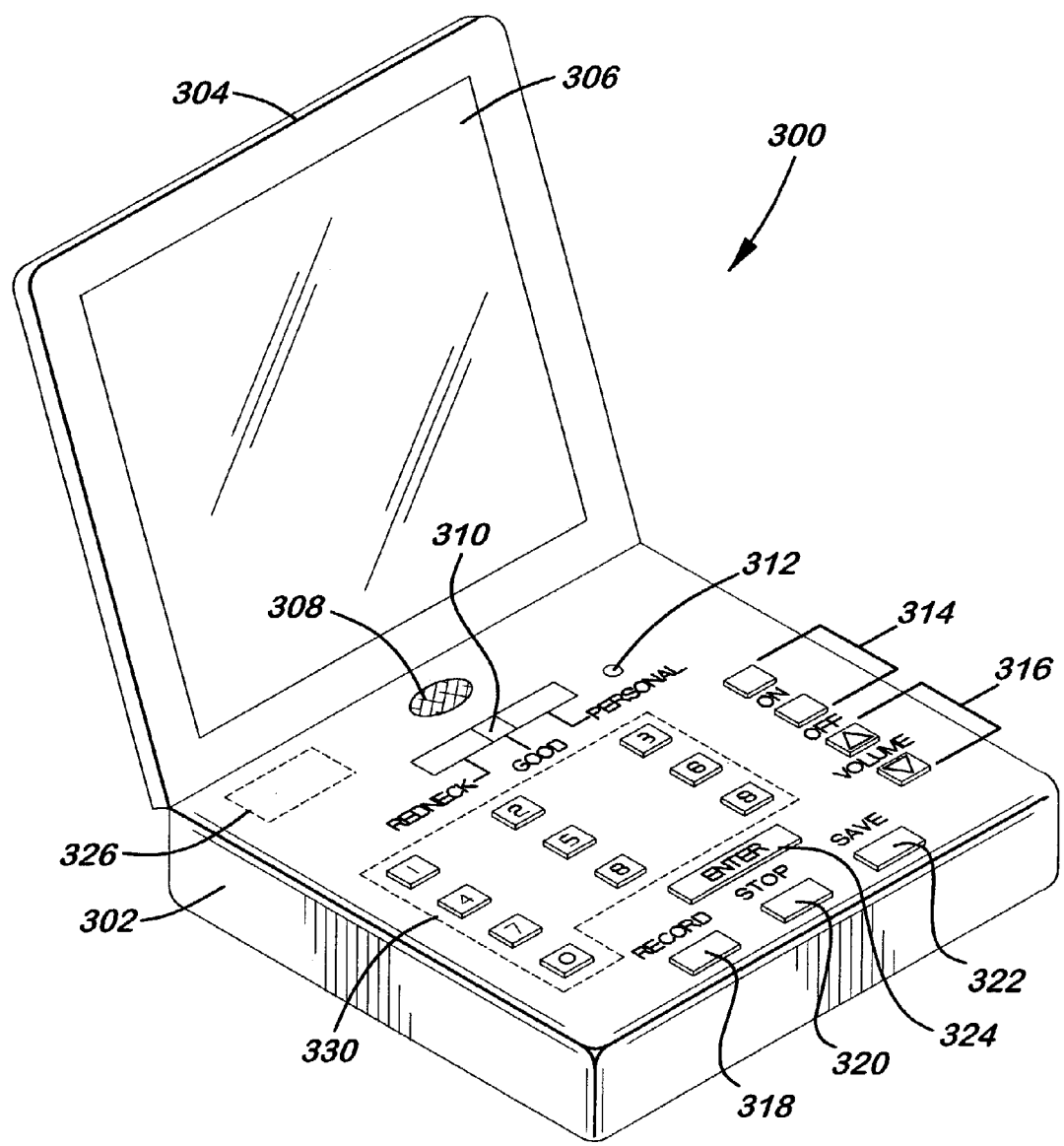
FIG. 3 is an isometric illustration of a two piece mood response system in accordance with an exemplary embodiment of the present invention.

An exemplary embodiment of a mood response system 300 comprising a first piece 302 connected to a second piece 304, is shown in FIG. 3. The first piece 302 further includes a speaker/microphone 308, a message set switch 310, a light 312, a two button on/off switch 314 and a volume adjust mechanism 316. Additionally, the first piece 302 includes a "RECORD" button 318, a "STOP" button 320, a "SAVE" button 322 and an "ENTER" button 324. Further, the first piece 302 includes a flag 326 and a keypad 330. The functional capabilities of the features described above are similar in all respects to those discussed for FIGS. 1 and 2, except the speaker/microphone 308 comprises one device in mood response system 300 as compared to the two devices described in FIGS. 1 and 2.

In this embodiment, the first piece 302 and the second piece 304 may be connected using a bracket, a hinged joint, or the like. Further, the second piece 304 may include a display screen 306, as shown. Additionally, the two piece system may include a latching mechanism, such as a snap lock, compression lock, or the like, to hold the two or more pieces together. As a two piece system the mood response system 300 may include additional functional capabilities, such as a handheld electronic address book, a palm pilot, a web platform, or other such capabilities as may be contemplated by one of ordinary skill in the art.

Figure 4:
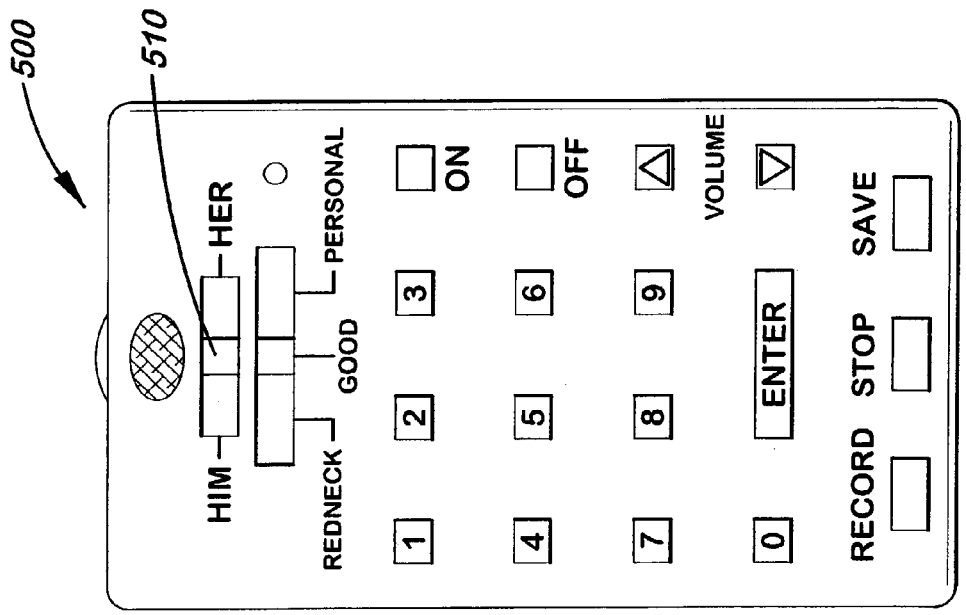
FIG. 4 is a front plan view of the mood response system of FIGS. 1 and 2, including a display screen.

Referring to FIG. 4, a mood response system 400 is shown, which is similar to the mood response system 100 of FIGS. 1 and 2, except that the mood response system 400 includes a display screen 410. The display screen may be a variety of designs, such as a standard monitor, liquid crystal display, or the like. The display screen may be statically positioned, unfold from the handheld controller, or be a flexible display screen which allows it to be extended from and retractable into the handheld controller. A coiling system may be included in the mood response system 400 to provide the retraction of the flexible display screen.

The display screen may enable a text display of each audio message within the message sets. This allows the user to view the message before audibly playing the message. Additionally, a text display feature may be connected to the recording function of the mood response system 400. A user is able to see the words, in a text format, that are being recorded into the personal message set. The display may include a back lighting capability for use of the mood response system in a dark room. This may be particularly useful for those users who watch television and/or movies on their televisions. Often times users will dim or turn the lights off completely while watching the television, thus a back lit display screen allows the user to continue utilizing the mood response system.

Figure 5:
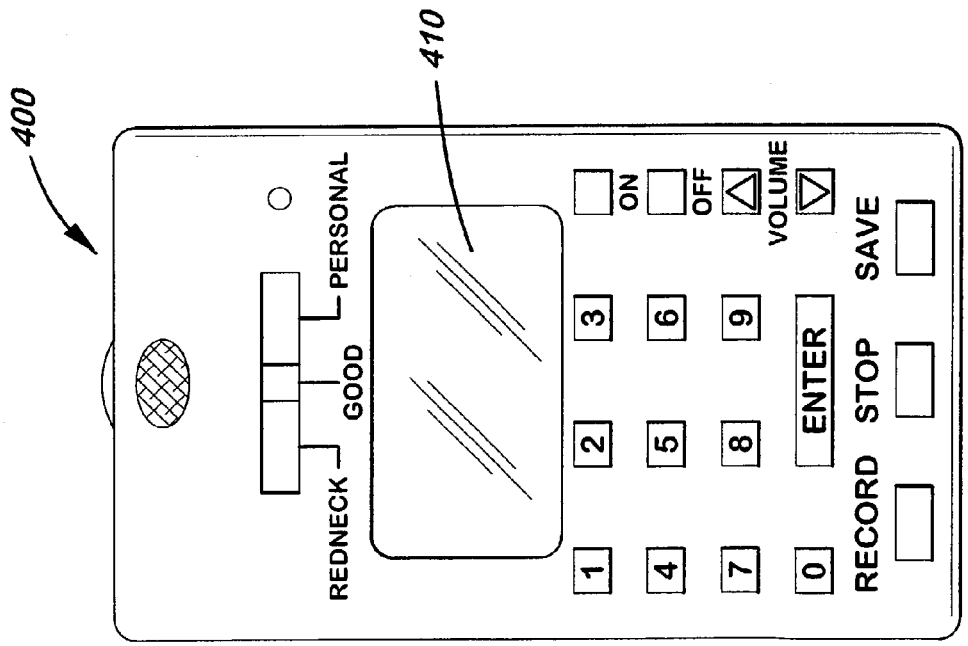
FIG. 5 is a front plan view of a mood response system of FIGS. 1 and 2, including a gender interface switch.

Referring to FIG. 5, a mood response system 500, which is similar to the mood response system 100 of FIGS. 1 and 2, except that the mood response system 500 includes a gender interface switch 510, is shown. The gender interface switch is disposed on the handheld controller 102 and enables the user to select between the "HIS" or "HER" message sets, which are both included within the mood response system 500. This capability may increase consumer interest in the product, appealing to both genders.

Figure 7:
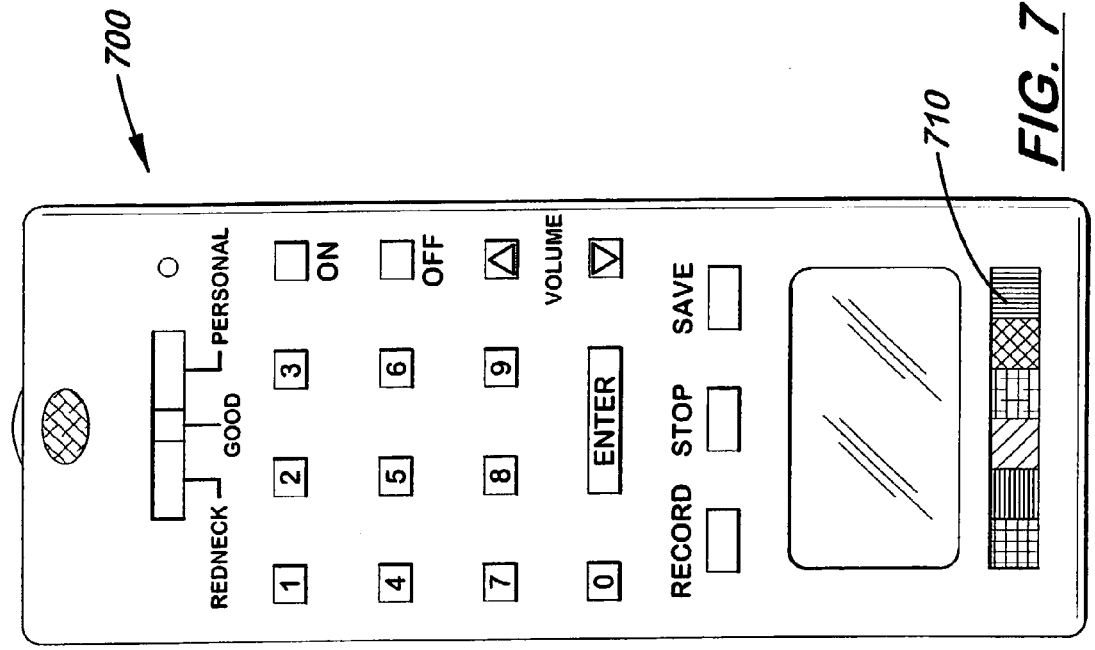
FIG. 7 is a front plan view illustrating the mood response system of FIG. 6, including a mood indicator system providing a mood gradient.
Figure 6:
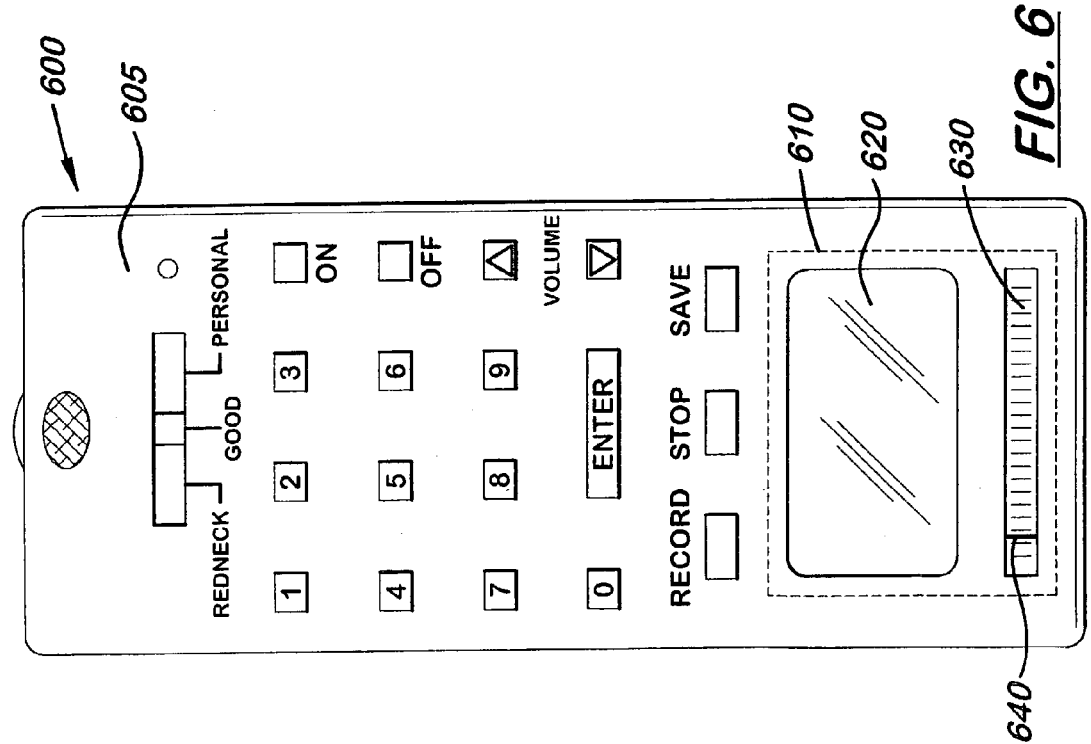
FIG. 6 is a front plan view illustrating a mood response system including a mood indicator system.

Referring to FIGS. 6 and 7, a mood response system 600 (similar to mood response system 100 in FIGS. 1 and 2), is shown, including a handheld controller 605 disposed with a mood indicator system 610 which includes a mood sensor 620 and a mood register 630. The mood indicator system 610 is an interactive system. The current mood of the operator may be determined through use of the mood indicator system 610. In operation the operator engages with the mood sensor 620. In the present embodiment, the mood sensor 620 is a touch pad and the operator places an index finger upon the touch pad and holds it there for some period of time. However, it is understood that other mechanisms may be employed as the mood sensor. After a period of time has passed the user may remove the index finger from the mood sensor 620 and the mood register 630 will display the current mood of the operator. The mood register 630 includes a needle indication device 640. Responding to the stimulus of the index finger upon the touch pad of the mood sensor 620, the needle of the mood register 630 moves side to side within the box that defines its range of movement.

Behind the needle is a background including markings. The markings correspond with a particular emotional state. In one embodiment, the emotional state may be identified by a printed word that corresponds with the marking. For example, a written listing may be provided which matches the needle mark indicated with a particular emotional state indicated by a word or phrase. In another embodiment, printed words indicating an emotional state may be included on the handheld controller. For instance, when the needle reaches the center marking, this corresponds to the printed emotional state "Content", which may be printed on the handheld controller 605 immediately above the marking. Other configurations for identifying emotional states and indicating those states may be employed without departing from the scope and spirit of the present invention.

In an exemplary embodiment, a mood gradient 710 may replace the mood register 630 as the emotional state indicator within the mood indicator system 610. The mood gradient 710 is coupled with the mood sensor 620, and as the user holds the index finger upon the touch pad the mood gradient 710 displays a color scheme which is used to identify the current emotional state of the user. As described above in FIG. 6, words or phrases may be included in a listing that correspond to particular color schemes, or words may be printed on the handheld controller 605 corresponding to particular colors within the mood gradient 710. Alternatively, a mood response system 600, which included a display screen as described in FIG. 4, may present a text message upon the display screen identifying the mood that corresponds with the color of the mood gradient or the needle of the mood register 630.

The location of the mood sensor 620 is on the front of the handheld controller 605. Alternatively, the mood sensor 620 may be located along one side of the handheld controller 605, preferably, in a position where the index finger of the user may easily be placed upon it. Also, the location of the mood register 630 and the mood gradient 710 may be varied, such as placing either of them on one side of the handheld controller 605.

In another embodiment of the mood response system 600, including the mood indicator system 610, the emotional state of the operator may be determined and the audio message may be selected and played by the mood response system 600. For example, the index finger of the operator is placed upon the mood sensor 620, which determines the emotional state of the operator, and then that emotional state of the operator is displayed by the mood register 630 or the mood gradient 710. The emotional state of the operator is communicated from the mood sensor 620 to the mood response system 600. The mood response system 600 selects the message set and the particular audio message from that message set, based on the information provided, and plays the selected audio message over the speaker.

Alternately, the mood response system 600 may provide the operator with a choice of several different audio messages determined by the mood response system 600 to match the mood of the operator, as determined by the mood indicator system 610. A mood response system 600, which includes the display screen (as described in FIG. 4) may provide the operator a visual listing of several different audio messages from which the operator may choose.

Figure 8:
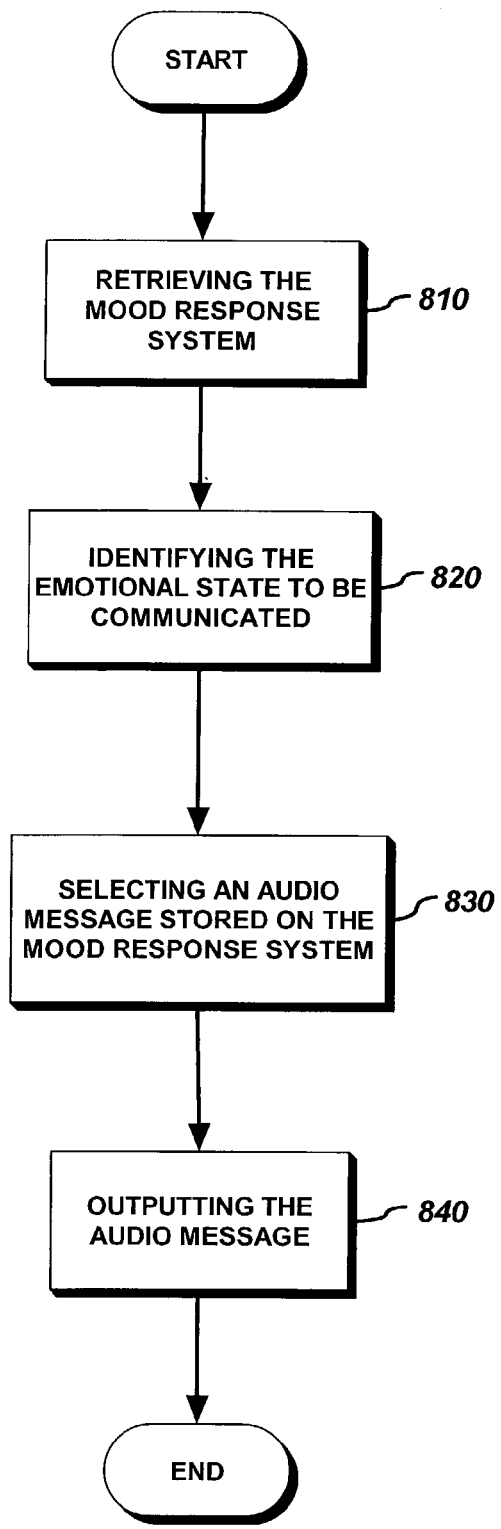
FIG. 8 is a flowchart illustrating a method of communication of an emotional state using the mood response system.

Referring now to FIG. 8 a method of communicating an emotional state using the mood response system of FIGS. 1 through 7, is shown. In step 810 a user retrieves the mood response system. In step 820 the user of the mood response system identifies the emotional state to be communicated. This may be accomplished by the user merely stating his or her current mood or the user may use the mood determining system coupled with the mood display device of FIGS. 6 and 7 to determine his or her current mood. After the emotional state has been determined the user then selects the audio message stored in the mood response system to be outputted in step 830. The method of selecting the audio message has been discussed and described at length in FIGS. 1 through 7, a similar method is employed in the present embodiment.

After the audio message is selected, in step 840, the audio message is outputted. This may occur over the speaker of the mood response system, as described in FIGS. 1 through 7. Alternatively, the mood response system may be in communication with a second mood response system, similar to the mood response system described above. The communication between the mood response systems may occur via a wireless communicative link or the like. If such is the case the audio message may be electronically broadcast from the mood response system to the second mood response system and then audibly played and/or broadcasted over the speaker of the second mood response system. Other systems for outputting the audio message stored on the mood response system, as contemplated by one of ordinary skill in the art, may be employed without departing from the scope and spirit of the present invention.

In the exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

It is believed that the mood response system of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A mood response system, comprising:
    a handheld controller including a housing suitable for being grasped by a user;
    a plurality of mood identifying message sets stored within the handheld controller each mood identifying message set of the plurality of mood identifying message sets including at least one audio message, the plurality of mood identifying message sets including at least one of a male mood identifying message set and a female mood identfying message set the plurality of mood identifying message sets further including at least one of a pre-programmed mood identifying message set and a user recordable mood identifying message set;
    a first selector disposed on the handheld controller, operable for selecting a mood identifying message set by the user; and
    a second selector disposed on the handheld controller, for providing selection of at least one of a male mood identifying message set and a female mood identifying message set,
    wherein the mood response system provides the user the ability to select and playback an audio message, included in the mood identifying message set, reflecting the emotional mood of the user.

2. The mood response system of claim 1, further comprising:
    a mood determining system disposed on the handheld controller, for providing an interactive mechanism for determining the mood of the user; and
    a mood display device disposed on the handheld controller and connected with the mood determining system, for displaying the mood of the user.

3. The mood response system of claim 2, wherein the mood response system selects and plays the audio message from the audio message set based on the mood of the user determined by the mood determining system.

4. The mood response system of claim 1, wherein the handheld controller further includes a speaker for audible playback of audio messages and a microphone suitable for recording audio messages.

5. The mood response system of claim 4, wherein the handheld controller, further comprises:
    a keypad allowing an operator to select an audio message to be played and store recorded audio messages to a particular location;
    an enter button disposed on the handheld controller for executing a function selected through use of the keypad;
    a volume adjust mechanism;
    a record button for recording an audio message into the one or more recordable message sets;
    a stop button for halting recording of an audio message; and
    a save button for locating a recorded audio message within a recordable message set.

6. The mood response system of claim 5, wherein the handheld controller further includes a universal serial bus port for connection with an information handling system.

7. The mood response system of claim 1, wherein the mood response system is an audio command controlled mood response system.

8. A method of communicating an emotional state using a mood response system, comprising:
    retrieving the mood response system, the mood response system including a handheld controller having accessible a plurality of mood identifying message sets, at least one of the plurality of mood identifying message sets being one of a pre-programmed mood identifying message set and a user recordable mood identifying message set, each mood identifying message set of the plurality of mood identifying message sets including an audio message, the handheld controller including a first selector switch for selecting an audio message stored on the mood response system, a second selector switch for selecting at least one of a male mood identifying message set and a female mood identifying message set, a keypad for selecting a function, an enter button disposed on the handheld controller for executing the function selected through use of the keypad, a volume adjust mechanism, a record button for recording an audio message into a recordable message set, a stop button for halting recording of an audio message, and a save button for locating a recorded audio message within a recordable message set;
    identifying the emotional state to be communicated to a third person;
    selecting an audio message stored on the mood response system, which corresponds to the emotional state; and outputting the audio message to communicate the emotional state to a third person.

9. The method of claim 8, wherein identifying the emotional state of the user further comprises the step of using a mood determining system, disposed on the handheld controller of the mood response system, for providing an interactive mechanism for determining the mood of the user; and a mood display device, disposed on the handheld controller of the mood response system, connected with the mood determining system, for displaying the mood of the user.

10. The method of claim 8, wherein selecting an audio message stored on the mood response system further comprises the step of choosing one of the buttons on the keypad which allows access to a particular audio message.

11. The method of claim 8, wherein outputting the message further comprises communicating the message by broadcasting the audio message over a speaker.

12. The method of claim 8, wherein outputting the message further comprises communicating the message by broadcasting the audio message to a second mood response system.

13. A mood response system comprising:
   means for selecting an audio message stored on the mood response system which corresponds to an emotional state, upon identifying the emotional state; and
   means for outputting the audio message to communicate the emotional state to a third person,
   wherein the mood response system further comprises:
   a handheld controller including a housing suitable for being grasped by a user;
   a mood identifying message set stored within the handheld controller, the mood identifying message set including an audio message;
   a first selector disposed on the handheld controller, operable for selecting a mood identifying message set by the user;
   one of a pre-programmed mood identifying message set and a user recordable mood identifying message set;
   a second selector disposed on the handheld controller, providing selection of at least one of a male mood identifying message set and a female mood identifying message set;
   a mood determining system disposed on the handheld controller, for providing an interactive mechanism for determining the mood of the user; and
   a mood display device disposed on the handheld controller and connected with the mood determining system, for displaying the mood of the user.

14. The mood response system of claim 13, wherein the handheld controller further comprises:
   a keypad allowing an operator to select an audio message to be played;
   an enter button disposed on the handheld controller for executing a function selected through use of the keypad;
   a volume adjust mechanism;
   a record button for recording the audio message into a recordable message set;
   a stop button for halting recording of the audio message;
   a save button for locating the recorded audio message within the recordable message set;
   a speaker for audible playback of audio messages and a microphone suitable for recording audio messages;
   a universal serial bus port for connection with an information handling system.

15. The mood response system of claim 13, wherein the mood response system automatically selects an audio message, from within a message set, to be played based on the mood display device response of the mood determining system.

16. The mood response system of claim 15, wherein the mood response system, based on the mood display device response of the mood determining system, automatically plays an audio message from a mood identifying message set.

17. The mood response system of claim 13, wherein the mood response system is an audio command controlled mood response system.

* * * * *